US008347006B2

(12) United States Patent
Zhang et al.

(10) Patent No.: US 8,347,006 B2
(45) Date of Patent: Jan. 1, 2013

(54) MINIMIZING INTERCONNECTIONS IN A MULTI-SHELF SWITCHING SYSTEM

(75) Inventors: Qiong Zhang, Plano, TX (US); Paparao Palacharla, Richardson, TX (US); Xi Wang, Murphy, TX (US); Takao Naito, Plano, TX (US)

(73) Assignee: Fujitsu Limited, Kawasaki-Shi (JP)

( * ) Notice: Subject to any disclaimer, the term of this patent is extended or adjusted under 35 U.S.C. 154(b) by 395 days.

(21) Appl. No.: 12/683,504

(22) Filed: Jan. 7, 2010

(65) Prior Publication Data

US 2011/0167183 A1 Jul. 7, 2011

(51) Int. Cl.
*G06F 13/00* (2006.01)
*G06F 17/50* (2006.01)
*G06G 7/62* (2006.01)

(52) U.S. Cl. .......................................... 710/104; 703/13
(58) Field of Classification Search .................. 710/104, 710/300–301; 703/13–15, 21; 716/100–105, 716/110, 116, 117–119, 124–125, 132
See application file for complete search history.

(56) References Cited

U.S. PATENT DOCUMENTS

| 7,203,850 | B2* | 4/2007 | Guo et al. ............ 713/300 |
| 7,289,513 | B1* | 10/2007 | Medved et al. .......... 370/395.31 |
| 2003/0061430 | A1* | 3/2003 | Soetemans et al. .......... 710/300 |
| 2005/0166169 | A1* | 7/2005 | Kurzum et al. ............ 716/10 |
| 2008/0306798 | A1* | 12/2008 | Anke et al. ............ 705/8 |
| 2010/0266281 | A1* | 10/2010 | Wang et al. ............ 398/59 |

OTHER PUBLICATIONS

"Cisco ONS 15454 DWDM Engineering and Planning Guide". Software and Product Release 7.x. Sep. 3, 2007. Cisco Systems, Inc.*
Stoer, Mechthild, et al. "A Simple Min-Cut Algorithm". Journal of the ACM. vol. 44, No. 4. Jul. 1997. ACM. pp. 585-591.*
Reichardt, Jörg, et al. "Statistical Mechanics of Community Detection". Physical Review E. 2006. American Physical Society. pp. 1-14.*
Somasundaram, K. "Multi-level Sequential Circuit Partitioning for Delay Minimization of VLSI Circuits". Journal of Information and Coomputing Science. vol. 2, No. 1. 2007. World Academic Press. pp. 66-70.*
Baruch, Zoltan, et al. "Partitioning for FPGA Circuits". MicroCAD '97 International Computer Science Meeting. Miskolc, Hungary. Section D. pp. 113-116. 1997.*
Yan, Jin-Tai, et al.. "A New Fuzzy-Clustering Based Approach for Two-Way Circuit Partitioning". 8th International Conference on VLSI Design. Jan. 1995. IEEE. pp. 359-364.*

(Continued)

*Primary Examiner* — Thomas J Cleary
(74) *Attorney, Agent, or Firm* — Baker Botts LLP

(57) ABSTRACT

In certain embodiments, minimizing interconnections in a multi-shelf switching system includes receiving a map describing the switching system, where the switching system comprises shelves and input/output (I/O) points. The map is transformed to yield a graph comprising nodes and edges. A node represents an I/O point, and a node weight represents a number of interface cards of the I/O point represented by the node. An edge between a node pair represents traffic demand between the I/O points represented by the node pair, and an edge weight represents the amount of the traffic demand represented by the edge. The graph is partitioned to yield a groups that minimize interconnection traffic among the shelves, where each group represents a shelf of the multi-shelf switching system.

10 Claims, 4 Drawing Sheets

OTHER PUBLICATIONS

Monien, Burkhard, et al. "Quality Matching and Local Improvement for Multilevel Graph-Partitioning". Feb. 22, 1999. Elsevier. pp. 1-29.*

B. W. Kernighan and S. Lin, "*An Efficient Heuristic Procedure for Partitioning Graphs*", The Bell System Technical Journal, pp. 291-307, Feb. 1970.

Olivier Goldschmidt and Dorit S. Hochbaum, "*Polynomial Algorithm for the k-Cut Problem*", IEEE, 0272-5428/88/0000/0444, pp. 444-451, 1988.

Kenneth L. Clarkson, "*A Las Vegas Algorithm for Linear Programming When the Dimension is Small*", IEEE, 0272-5428/88/0000/0452, pp. 452-453, 1988.

George Karypis and Vipin Kumar, "*Multilevel k-way Partitioning Scheme for Irregular Graphs*", Journal of Parallel and Distributed Computing 48, Article No. PC971404, pp. 96-129, 1998.

Ramu Ramamurthi, et al., "*Limitations of Scaling Switching Capacity by Interconnecting Multiple Switches*", Optical Society of America, 8 pages, 2005.

* cited by examiner

MINIMIZING INTERCONNECTIONS IN A MULTI-SHELF SWITCHING SYSTEM

TECHNICAL FIELD

This invention relates generally to the field of switching systems and more specifically to minimizing interconnections in a multi-shelf switching system.

BACKGROUND

In a single-shelf switching system, the shelf may be divided into a number of slots, each of which is able to support an interface card. As traffic increases, a single-shelf switching system may not have enough slots to accommodate the increased traffic. The system may use additional shelves to handle the traffic. The interconnection traffic between the shelves, however, may need to be minimized.

SUMMARY OF THE DISCLOSURE

In accordance with the present invention, disadvantages and problems associated with previous techniques for organizing multi-shelf switching systems may be reduced or eliminated.

In certain embodiments, minimizing interconnections in a multi-shelf switching system includes receiving a map describing the switching system, where the switching system comprises shelves and input/output (I/O) points. The map is transformed to yield a graph comprising nodes and edges. A node represents an I/O point, and a node weight represents a number of interface cards of the I/O point represented by the node. An edge between a node pair represents traffic demand between the I/O points represented by the node pair, and an edge weight represents the amount of the traffic demand represented by the edge. The graph is partitioned to yield a groups that minimize interconnection traffic among the shelves, where each group represents a shelf of the multi-shelf switching system.

In certain embodiments, minimizing interconnections in a multi-shelf switching system includes receiving a description of the switching system. The switching system comprises shelves and trunks, where the trunks are organized into trunk pairs and each trunk pair has a traffic demand. The following is performed for each trunk pair in order of decreasing traffic demand and for each shelf in order of decreasing number of assigned trunks: a trunk pair is assigned to a shelf if a condition is satisfied in order to minimize interconnection traffic.

Certain embodiments of the invention may provide one or more technical advantages. A technical advantage of one embodiment may be that a map describing a multi-shelf switching system may be transformed to yield a graph describing the multi-shelf switching system. The graph may be used in an optimization problem that partitions the graph into groups. The groups represent an assignment of trunks to the shelves of the system that may minimize interconnections among the shelves. Another technical advantage of one embodiment may be that a technique for assigning the trunks to the shelves may avoid creating interconnections and may improve packing density in order to minimize interconnections.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
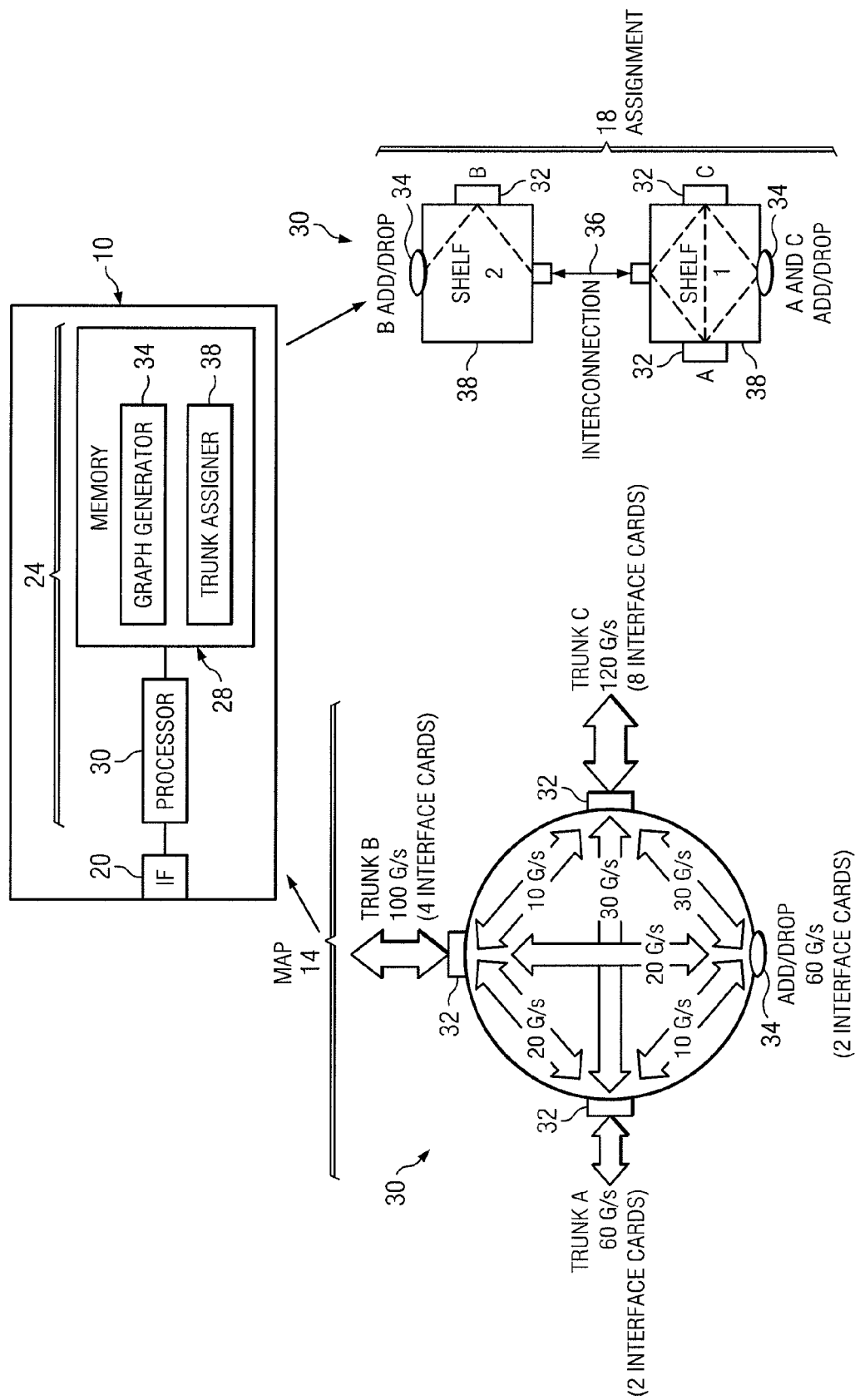
FIG. 1 illustrates an example of a system that is configured to assign trunks in a multi-shelf switching system.

FIG. 1 illustrates an example of a system 10 that is configured to assign trunks in a multi-shelf switching system. In certain embodiments, system 10 transforms a map describing a multi-shelf switching system to yield a graph describing the multi-shelf switching system. The graph may be used in an optimization problem that partitions the graph into groups. The groups represent an assignment of trunks to the shelves of the system that minimizes interconnections among the shelves. In certain embodiments, system 10 utilizes a technique for assigning the trunks to the shelves that avoids creating interconnections and improves packing density in order to minimize interconnections.

In the illustrated example, system 10 includes an interface 20, logic 24, and a memory 28. Logic 24 includes a processor 30, and applications such as graph generator 34 and trunk assigner 38 stored at memory. In certain embodiments, system 10 receives a map 14 describing a multi-shelf switching system 30 comprising shelves 38 and input/output (I/O) points, such as trunks and add/drop points 34. System 10 outputs an assignment 18 of points to shelves 38.

To generate assignment 18, system 10 transforms map to yield a graph comprising nodes and edges that represent the I/O points and traffic demands between the I/O points, respectively. System 10 partitions the graph to yield groups that minimize interconnection traffic among shelves 38, where each group represents a shelf 38 of multi-shelf switching system 30. System 10 may then output assignment 18 of I/O points to shelves 38 based on the groups.

In certain embodiments, multi-shelf switching system 30 comprises a plurality of shelves 38 and a plurality of input/output (I/O) points, such as trunks 32 and add/drop points 34. Examples of multi-shelf switching systems 30 include reconfigurable optical add-drop multiplexer (ROADM) and electronic network switch systems.

A shelf 38 may have one or more slots, each of which is configured to support an interface card. An interface card may be a modular electronic circuit on a printed circuit board that operates to interface devices and/or networks. For example, an interface card may operate as an interface between a computer and a local area network or between a local area network and a wide area network. An interface card may be able to support a certain amount of traffic, such as an amount in one of the following ranges: less than 20, 20 to 40, 40 to 60, or greater than 60 G/s gigabits per second (G/s). In the illustrated example, each interface card supports 40 G/s of traffic.

An I/O point may be an ingress/egress trunk 32 or an add/drop termination point 34. In certain embodiments, a trunk 32 may be a communication line between switching systems. An ingress trunk 32 may receive traffic at switching system 30, an egress trunk 32 may transmit traffic from switching system 30. A particular trunk 32 may have a switching capacity for a particular amount of traffic and may require the use of a particular number of interface cards. In certain embodiments, "I/O point" may be used interchangeably with "trunk."

In the illustrated example, trunks 32 of switching system 30 includes trunks A, B, and C. Trunk A has a switching capacity of 60 G/s and requires two interface cards. Trunk B has a switching capacity of 100 G/s and requires four interface cards. Trunk C has a switching capacity of 120 G/s and requires eight interface cards.

In certain embodiments, add/drop termination point adds and/or drops traffic. An add/drop termination point 34 may have a switching capacity for a particular amount of traffic and may require the use of a particular number of interface cards. In the illustrated example, add/drop termination point 34 has a switching capacity of 60 G/s and requires two interface cards.

Traffic travels through and/or between I/O points, such as trunk pairs. Add/drop traffic travels through an ingress/egress trunk 32 and an add/drop termination point. Added traffic travels through an add/drop termination point 34 and then an egress trunk 32. Dropped traffic travels through an ingress trunk 32 and then through an add/drop termination point 34. In certain situations, traffic may be groomed at a shelf.

Pass-through traffic travels between ingress/egress trunks 32, or trunk pairs, such as through an ingress trunk 32 and then through an egress trunk 32. In the illustrated example, the traffic demand between trunks A and B is 20 G/s, between trunks B and C is 10 G/s, between trunks A and C is 30 G/s, between trunk A and add/drop point is 10 G/s, between trunk B and add/drop point is 20 G/s, and between trunk C and add/drop point is 30 G/s.

In multi-shelf switching system 30, the ingress and egress trunks 32 for pass-through traffic may be on the same or different shelves 38. If ingress and egress trunks 32 are on different shelves 38, then an interconnection 36 between the shelves 38 carries the pass-through traffic as interconnection traffic.

Different assignments 18 of ingress and egress trunks 32 to shelves 38 may result in different amounts of interconnection traffic. In certain situations, assignments 18 that minimize interconnections 36 may be desired. Interconnections 36 may require additional interface cards and slots on shelves 38, so minimizing interconnections 36 may reduce these costs. In addition, minimizing interconnections 36 may allow for more interconnections 36 that can be saved for future growth.

In certain embodiments, map 14 describes the following features of a multi-shelf switching system 30. In the embodiments, map 14 may describe the following: the number of shelves, the number of slots per shelf, the number of slots of a shelf reserved for I/O points, the number of slots of a shelf reserved for interconnections, the capacity of an interface card, the number of interface cards that each trunk requires, and/or the traffic demand for each trunk pair.

In certain embodiments, graph generator 34 transforms map 14 to yield a graph. Trunk assigner 38 partitions the graph to yield groups that minimize interconnection traffic among the shelves. Each group represents a shelf of the multi-shelf switching system. In certain embodiments, trunk assigner 38 partitions a graph according to an optimization technique applied to an optimization problem. Generation of a graph is described in more detail with reference to FIG. 2, and partitioning the graph is described in more detail with reference to FIG. 3 through 5.

System 10 outputs assignment 18 of trunks to shelves according to the partitions. Assignment 18 may be output on an output modules of system 10 such as a display or printer. In the illustrated example, trunk B is assigned to shelf 2, and trunks A and C are assigned to shelf 1.

Figure 2:
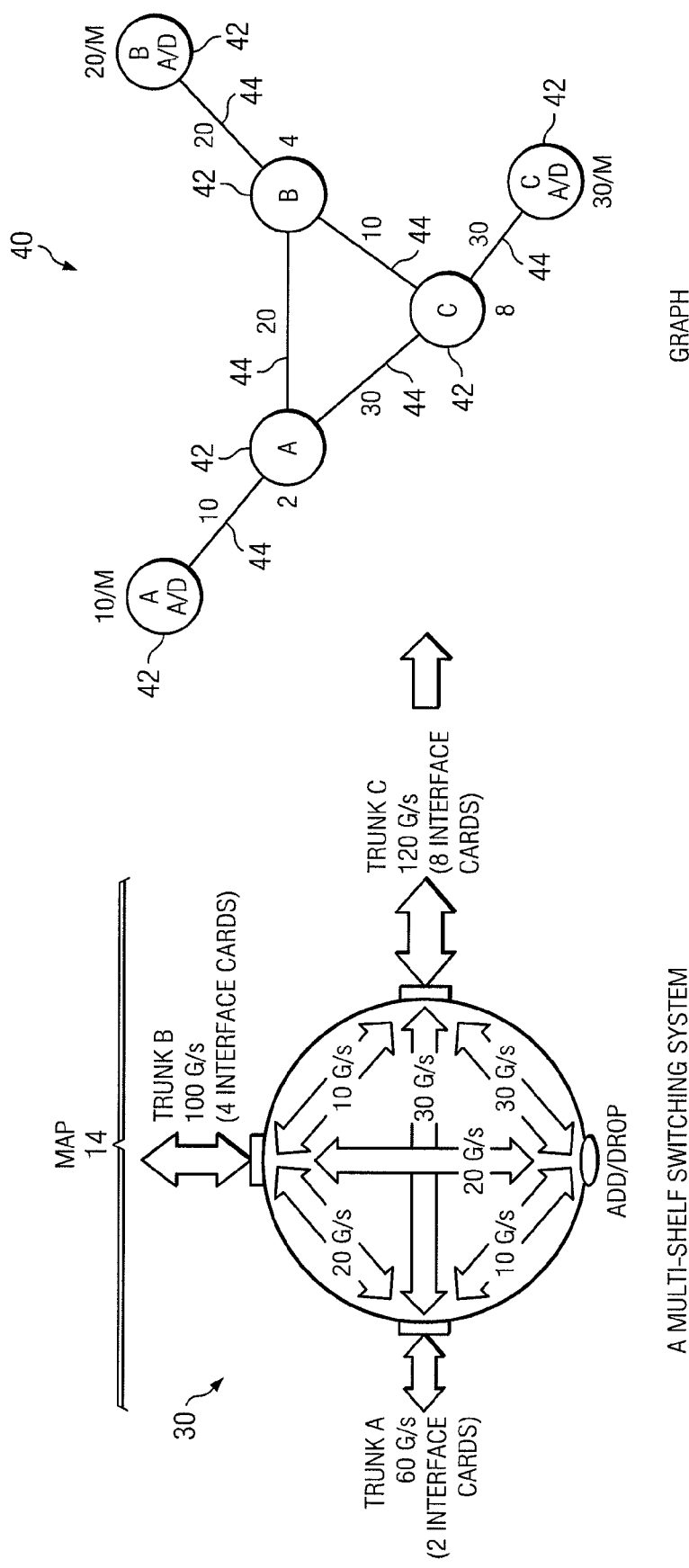
FIG. 2 illustrates an example of a graph that may be generated according to a map of FIG. 1.

FIG. 2 illustrates an example of a graph 40 that may be generated according to map 14 of FIG. 1. Graph 40 comprises nodes 42 and edges 44, where an edge 44 is between a node pair comprising two nodes 42. A node 42 represents an I/O point, and a node weight of the node 42 represents a number of interface cards required by the I/O point represented by the node 42. A node pair may represent traffic, such as pass-through traffic between trunks or add/drop traffic between a trunk and add/drop termination point.

An edge 44 between a node pair represents traffic demand between two I/O points represented by the node pair, and an edge weight of the edge 44 represents the amount of the traffic demand represented by the edge 44. In the embodiments, "node" may be used interchangeably with "I/O point," "node weight" with "number of interface cards," "edge" with "traffic demand," and "edge weight" with "amount of the traffic demand."

In the illustrated example, nodes A, B, and C, represent trunks A, B, and C, respectively. Nodes A A/D, B A/D, and C A/D represent add/drop points for trunks A, B, and C, respectively. The number by a node 42 indicates the number of interface cards required by the I/O point represented by the node 42. The number by an edge 44 indicates the traffic demand of the traffic represented by the edge 44.

Figure 3:
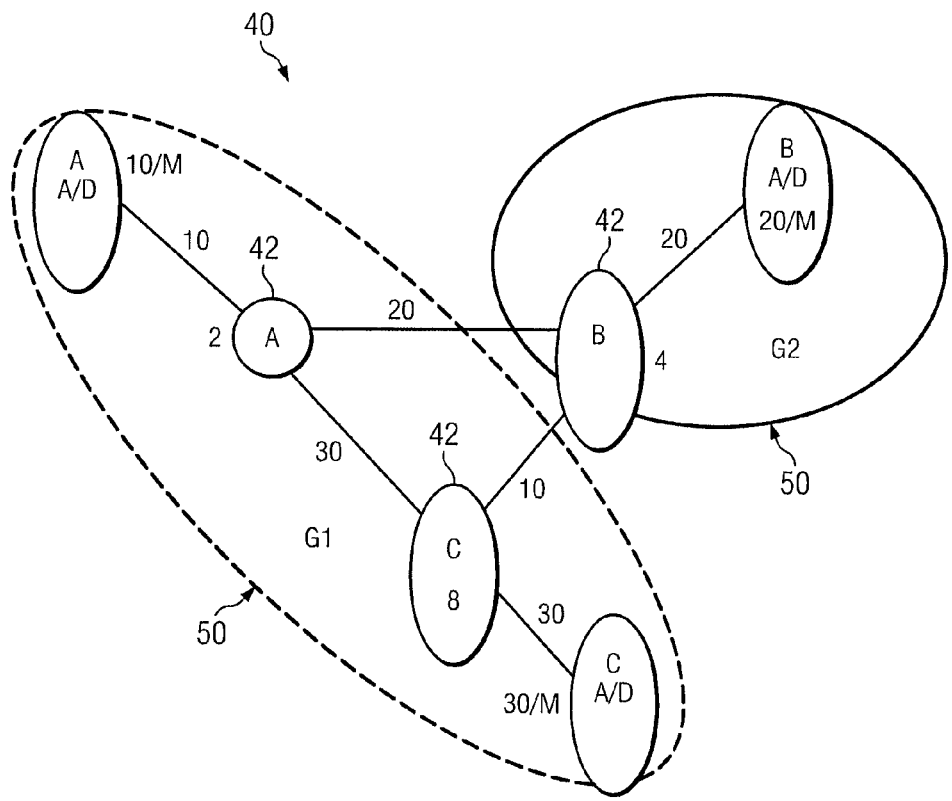
FIG. 3 illustrates an example of the graph of FIG. 2 that has been partitioned into groups.

FIG. 3 illustrates an example of graph 40 that has been partitioned into groups 50, such as groups G1 and G2. A group 50 includes nodes 42 and represents a shelf 38. In the example, group G1 includes nodes A and C and represents Shelf 1 of assignment 18. Group G2 includes node B and represents Shelf 2.

Trunks represented by nodes 42 of a particular group 50 may be assigned to the shelf 38 represented by the group 50. In the embodiments, "group" may be used interchangeably with "shelf." In the illustrated example, according to group G1, trunks A and C may be assigned to shelf 1, and according to group G2, trunk B may be assigned to shelf 2.

In certain embodiments, graph 40 may be partitioned according to an optimization technique applied to an optimization problem. For example, the optimization problem may be described as follows.

Objective: Minimize the amount of interconnection traffic between shelves of a switching system.

Given:
  K=number of shelves of the switching system
  S=number of slots per shelf
  S1=number of slots of a shelf for I/O points
  S2=number of slots of a shelf for interconnections
  S1+S2=S
  M=capacity of an interface card (which may be used for traffic grooming)
  For each trunk X, number of interface cards C that trunk X requires=X(C)
  For each trunk pair (X,Y), traffic demand D for trunk pair (X,Y)=(X,Y,D)

Constraints at a Shelf:
1. Number of slots used by I/O points≦S1
2. Number of slots used by interconnections≦S2

The number of shelves K may be determined from the number of required slots R and the number of slots per shelf S according to K×S≧R. The number of required slots R may be, for example, the number of slots required by the trunks plus the number reserved for interconnection traffic.

In certain embodiments, the optimization problem may be applied to graph 40 as follows.

Objective: Partition nodes into K groups such that Min(ΣCut (Gi)).
Given:
  Gi=group i
  Cut(Gi)=the total weight of edges between Gi and other groups
  N(Gi)=the total of node weights in Gi
Constraints at a Shelf:
  1. Node weights of I/O points≦S1  N(Gi)≦S1
  2. Node weights of interconnections≦S2  Cut (Gi)/M≦S2
Given:
  Number of groups K=2
  Capacity of an interface card M=40
  Node weights of shelf S=12,
  Node weights of shelf for I/O points S1=10
  Node weights of shelf for interconnections S2=2
Example Groups:
  G1={A, C, A(A/D), C(A/D)}
  G2={B, B(A/D)}
Constraints:
  1.   N(G1)=2+8+10/M+30/M=11<S1    N(G2)=4+20/M≈5<S1
  2. Cut(G1)/M=Cut(G2)/M=30/M=2=S2
  Cut(G1)=Cut(G2)=20+10=30

In certain embodiments, the partition problem takes into account node weights and/or constraints for node and/or cut weights. In addition, in certain embodiments, the partition problem does not require that the total node weight among groups is equal. In certain embodiments, the partition problem is NP-complete.

As used in particular embodiments, "minimize" generally means to perform an optimization that minimizes interconnections. Minimize does not imply that the optimization necessarily yields the absolute minimum number of interconnections, although optimization can, in certain cases, yield the absolute minimum number of interconnections.

Figure 4:
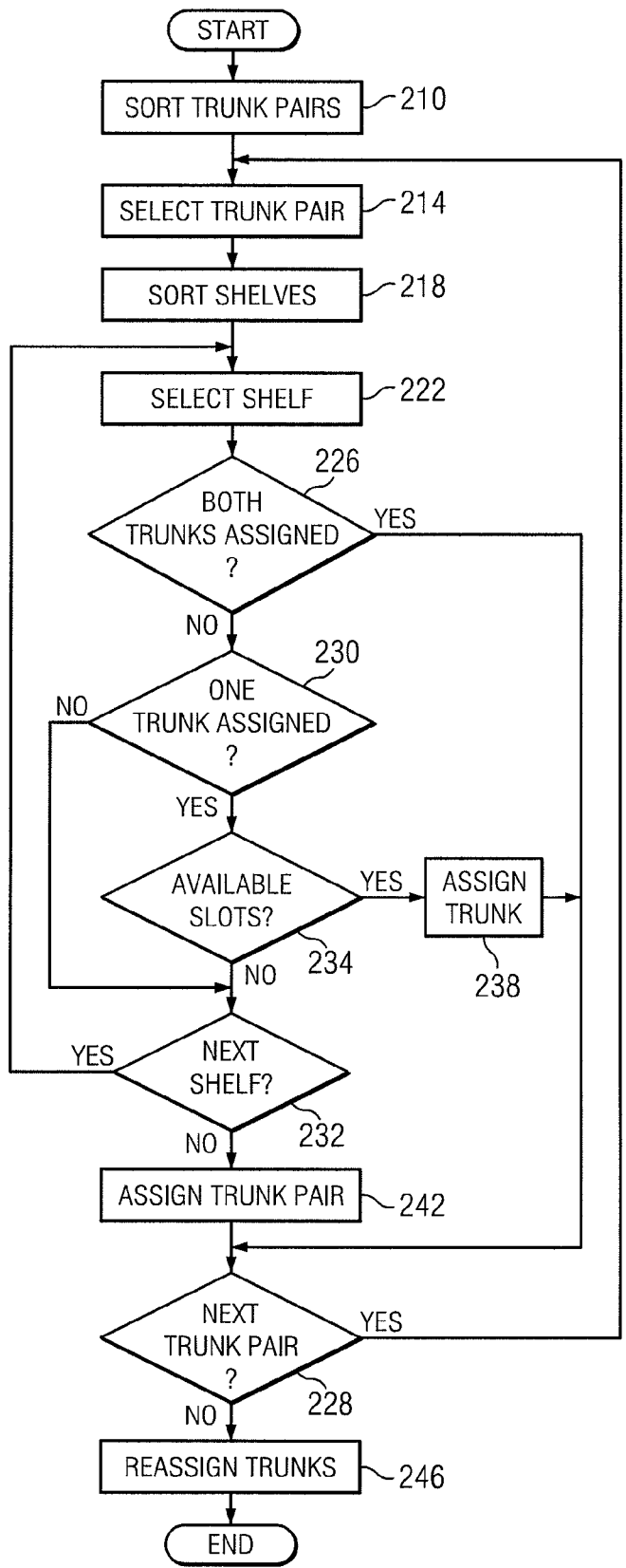
FIG. 4 illustrates an example of a method that may be used to partition a graph in order to assign trunks to shelves.

FIG. 4 illustrates an example of a method that may be used to partition a graph 40 in order to assign trunks 32 to shelves 38. The method may be performed by system 10 of FIG. 1.

In certain embodiments, the method performs the following:
(1) assign a node pair with the highest traffic demand to a group;
(2) if a first node of a node pair has been assigned to a group, assigning a second node of the node pair to the group; and
(3) assigning a node pair to a group with the highest number of assigned nodes.

In the embodiments, when the method performs the above steps, the method may be regarded as performing the following:
(1) assigning a trunk pair with the highest traffic demand to a shelf;
(2) if a first trunk of a trunk pair has been assigned to a shelf, assigning a second trunk of the trunk pair to the shelf; and
(3) assigning a trunk pair to a shelf with a highest number of assigned trunks.

In certain embodiments, the method operates on trunk pairs (X,Y), where X represents a first trunk and Y represents a second trunk. The trunk pair has a traffic demand between trunks X and Y. The method starts at step 210, where trunk pairs are sorted according to traffic demand. For example, trunk pairs may be sorted in order of decreasing traffic demand. If trunk pairs are sorted in this order, a trunk pair with the highest traffic demand is typically assigned first. A trunk pair is selected in order at step 214.

Shelves are sorted according to the number of trunks assigned to the shelves at step 218. For example, shelves may be sorted in order of decreasing number of assigned trunks. In certain embodiments, shelves with no availability, for example, no available slots, may be omitted. A shelf is selected in order at step 222.

Steps 226, 230, and 234 may be regarded as assigning the selected trunk pair to the selected shelf if a condition is satisfied. The trunks of the selected trunk pair may have already been assigned to the selected shelf at step 226. For example, in previous iterations, trunk pairs (A,B) and (C,D) may have been assigned to the selected shelf. If the selected trunk pair is (A,D), then the trunks of the selected trunk pair have already been assigned to the selected shelf.

If the trunks of the selected trunk pair have already been assigned, then the method proceeds to step 228. There may be a next trunk pair at step 228 that has not been assigned. If there is a next trunk pair, the method returns to step 214 to select the next trunk pair. Otherwise, the method proceeds to step 246.

If the trunks of the selected trunk pair have not been assigned at step 226, the method proceeds to step 230. A trunk of the selected trunk pair may have already assigned to the selected shelf at step 230. For example, in a previous iteration, trunk pair (A,B) may have been assigned to the selected shelf. If the selected trunk pair is (A,D), then a trunk of the selected has already been assigned to the selected shelf. If the trunk of the selected trunk pair has already assigned, then the method proceeds to step 234. Otherwise, the method proceeds to step 232.

There may be a next shelf of the sorted shelves at step 232. If there is a next shelf, the method returns to step 222 to select the next shelf. Otherwise, the method proceeds to step 242.

Slots of the selected shelf may be available to accommodate the selected trunk pair at step 234. Availability of slots may be determined using the constraints of the partition problem. For example, slots may be available if: (1) the number of available slots is greater than or equal to the number of slots needed to add the trunk pair; and/or (2) the number of available interconnection slots is greater than or equal to the number of interconnection slots needed to add the trunk pair. The number of available slots may be the number of slots that have not been assigned to an interface card. The number of available interconnection slots may be the number of reserved interconnection slots that have not been assigned. If slots of the selected shelf are available to accommodate the selected trunk pair, the method proceeds to step 238. Otherwise, the method proceeds to step 232.

The unassigned trunk of the selected trunk pair is assigned to the selected shelf at step 238. The method then returns to step 228 to check if there is a next trunk pair.

The trunk pair that is unassigned at step 242 is assigned to any suitable shelf. For example, the trunk pair may be assigned to a shelf that has the highest number of trunks and that has slots available to accommodate the trunk pair.

The trunks may be reassigned to different shelves at step 246 to further minimize interconnection traffic. The trunks may be reassigned in any suitable manner. In certain embodiments, a trunk pair may be reassigned from a shelf that does not have a common trunk to a shelf that has a common trunk. For example, trunk pairs (A,B) and (C,D) may be assigned to Shelf 1 and trunk pair (E,F) may be assigned to Shelf 2, which also has trunk pair (F, D). Reassigning trunk pair (C,D) from Shelf 1 to Shelf 2 may reduce the interconnections.

Figure 5:
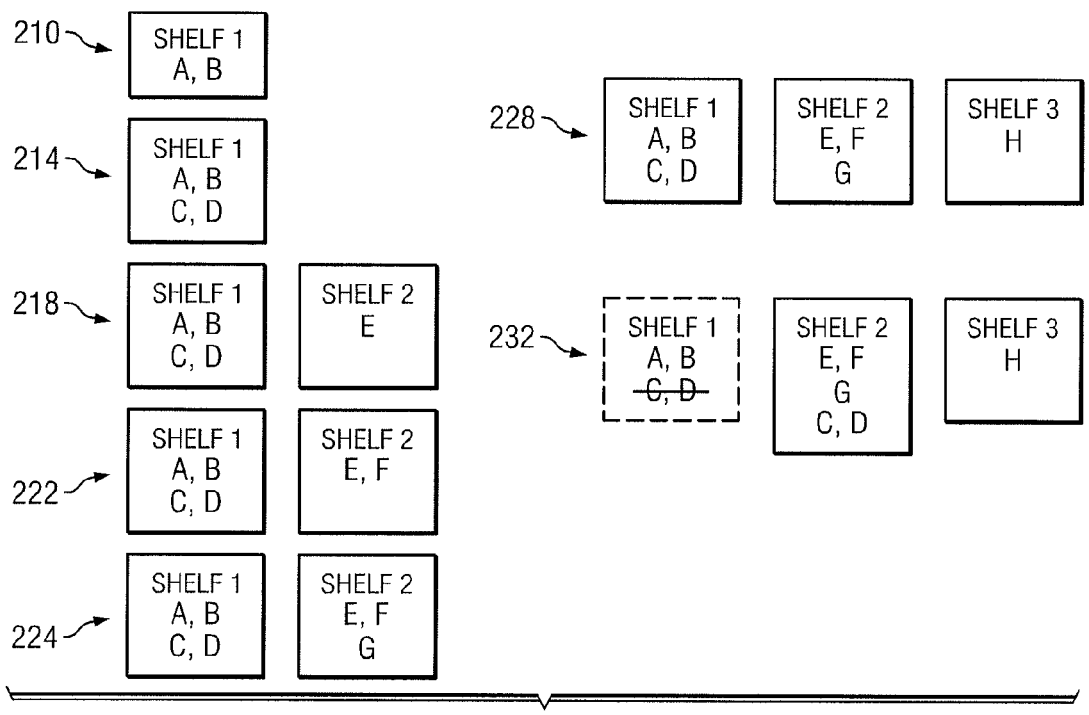
FIG. 5 illustrates an example of an optimization problem that partitions a graph in order to assign trunks to shelves.

FIG. 5 illustrates an example of an optimization problem that partitions a graph 40 in order to assign trunks 32 to shelves 38.

Given:
  Number of slots of shelf S=16,
  Number of slots of shelf for I/O points S1=12
  Number of slots of shelf for interconnections S2=4
  Capacity of an interface card M=2
  Number of interface cards C that trunk X requires=X(C): A(4), B(4), C(1), D(1), E(4), F(4), G(2), H(6)
  For each trunk pair (X,Y), traffic demand D for trunk pair (X,Y)=(X,Y,D): (A,B,5), (C,D,3), (B,E,3), (E,F,2), (F,D,2), (G,E,2), (G,H,1)

Constraints at a Shelf:
  1. Number of slots used by I/O points≦S1=12. The number of slots used by I/O points may be the sum of interface cards required by the trunks assigned to the shelf, which may be expressed as $\Sigma X_i(C_i)$, where $X_i$ is assigned to the shelf.
  2. Number of slots used by interconnections≦S2=4. The number of slots used by interconnections may be the sum of traffic demands of the trunks assigned to the shelf divided by the capacity of an interface card, which may be expressed as $\Sigma X_i(D_i)/M$, where $X_i$ is assigned to the shelf.

In the example, the sorted demands are (A,B,5), (C,D,3), (B,E,3), (E,F,2), (F,D,2), (G,E,2), (G,H,1). The trunks are added to shelves in the following manner.

Trunks A and B are assigned to Shelf 1 at step 210.
  $\Sigma X_i(C_i)$=4+4=8 for Shelf 1
  $\Sigma X_i(D_i)/M$=3/2~2 for Shelf 1
  Number of interconnections: two for Shelf 1
  Trunks C and D are assigned to Shelf 1 at step 214.
  $\Sigma X_i(C_i)$=8+1+1=10 for Shelf 1
  $\Sigma X_i(D_i)/M$=(3+2)/2~3 for Shelf 1
  Number of interconnections: three for Shelf 1
  Trunk E is assigned to Shelf 2 at step 218.
  $\Sigma X_i(C_i)$=4 for Shelf 2
  $\Sigma X_i(D_i)/M$=(3+2+2)/2=4 for Shelf 2
  Number of interconnections: three for Shelf 1+four for Shelf 2=seven
  Trunk F is assigned to Shelf 2 at step 222.
  $\Sigma X_i(C_i)$=4+4=8 for Shelf 2
  $\Sigma X_i(D_i)/M$=(3+2+2)/2=4 for Shelf 2
  Number of interconnections: three for Shelf 1+four for Shelf 2=seven
  Trunk G is assigned to Shelf 2 at step 224.
  $\Sigma X_i(C_i)$=8+2=10 for Shelf 2
  $\Sigma X_i(D_i)/M$=(3+2+1)/2=3 for Shelf 2
  Number of interconnections: three for Shelf 1+three for Shelf 2=six
  Trunk H is assigned to Shelf 3 at step 228.
  $\Sigma X_i(C_i)$=6 for Shelf 3
  $\Sigma X_i(D_i)/M$=1/2~1 for Shelf 3
  Number of interconnections: three for Shelf 1+three for Shelf 2+one for Shelf 3=seven
  Trunks C and D are reassigned to Shelf 2 at step 228.
  $\Sigma X_i(C_i)$=10−(1+1)=8 for Shelf 1
  $\Sigma X_i(D_i)/M$=3/2~2 for Shelf 1
  $\Sigma X_i(C_i)$=10+2=12 for Shelf 2
  $\Sigma X_i(D_i)/M$=(3+1)/2=2 for Shelf 2
  $\Sigma X_i(C_i)$=6≦S1 for Shelf 3
  $\Sigma X_i(D_i)/M$=1/2~1 for Shelf 3
  Number of interconnections: two for Shelf 1+two for Shelf 2+one for Shelf 3=five Reassigning the trunks decreases the number of interconnections.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of graph generator 34 and trunk assigner 38 may be performed by one component, or the operations of graph generator 34 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    receiving a map describing a multi-shelf switching system, the multi-shelf switching system comprising a plurality of shelves and a plurality of input/output (I/O) points;
    transforming the map to yield a graph comprising a plurality of nodes and a plurality of edges, a node representing an I/O point, a node weight of a node representing a number of interface cards of the I/O point represented by the node, an edge between a node pair representing traffic demand between the I/O points represented by the node pair, an edge weight of an edge representing the amount of the traffic demand represented by the edge; and
    partitioning the graph to yield a plurality of groups that minimize interconnection traffic among the shelves, each group representing a shelf of the multi-shelf switching system.

2. The method of claim 1, the I/O points comprising one or more ingress/egress trunks and one or more add/drop termination points.

3. The method of claim 1, the partitioning the graph further comprising:
    assigning a node pair with the highest traffic demand to a group.

4. The method of claim 1, the partitioning the graph further comprising:
    if a first node of a node pair has been assigned to a group, assigning a second node of the node pair to the group.

5. The method of claim 1, the partitioning the graph further comprising:
    assigning a node pair to a group with the highest number of assigned nodes.

6. One or more computer readable storage media encoded with computer code when executed by a processor configured to:
    receive a map describing a multi-shelf switching system, the multi-shelf switching system comprising a plurality of shelves and a plurality of input/output (I/O) points;
    transform the map to yield a graph comprising a plurality of nodes and a plurality of edges, a node representing an I/O point, a node weight of a node representing a number of interface cards of the I/O point represented by the node, an edge between a node pair representing traffic demand between the I/O points represented by the node pair, an edge weight of an edge representing the amount of the traffic demand represented by the edge; and
    partition the graph to yield a plurality of groups that minimize interconnection traffic among the shelves, each group representing a shelf of the multi-shelf switching system.

7. The computer readable storage media of claim 6, the I/O points comprising one or more ingress/egress trunks and one or more add/drop termination points.

8. The computer readable storage media of claim 6, the computer code configured to partition the graph by:
    assigning a node pair with the highest traffic demand to a group.

9. The computer readable storage media of claim 6, the computer code configured to partition the graph by:
    if a first node of a node pair has been assigned to a group, assigning a second node of the node pair to the group.

10. The computer readable storage media of claim 6, the computer code configured to partition the graph by:
    assigning a node pair to a group with the highest number of assigned nodes.

* * * * *